United States Patent [19]

Coffee

[11] 4,362,275
[45] Dec. 7, 1982

[54] SPRAYERS

[75] Inventor: Ronald A. Coffee, Haslemere, England

[73] Assignee: Imperial Chemical Industries Limited, London, England

[21] Appl. No.: 201,971

[22] Filed: Oct. 29, 1980

[30] Foreign Application Priority Data

Nov. 19, 1979 [GB] United Kingdom ............... 7935554

[51] Int. Cl.$^3$ ............................................... B05B 3/10
[52] U.S. Cl. .................................................. 239/700
[58] Field of Search ............... 239/700, 703, 701, 702, 239/704, 705, 706, 690, 691, 692, 693, 694, 695, 696, 697, 698, 699, 3; 118/621, 626, 629

[56] References Cited

U.S. PATENT DOCUMENTS

| | | | |
|---|---|---|---|
| 2,899,136 | 8/1959 | Reindl | 239/700 |
| 3,010,428 | 11/1961 | Sedlacsik | 118/626 |
| 3,221,922 | 12/1965 | Sedlacsik, Jr. et al. | 239/15 |
| 3,411,715 | 11/1968 | Wallis | 239/700 |
| 3,418,971 | 12/1968 | Lamm | 118/626 |
| 3,475,198 | 10/1969 | Drum | 117/934 |

FOREIGN PATENT DOCUMENTS 1,515,511 11/1966 United Kingdom .

Primary Examiner—James B. Marbert
Attorney, Agent, or Firm—Cushman, Darby & Cushman

[57] ABSTRACT

A device to use as an agricultural sprayer, comprising a rotatable conductive sprayhead in the form of a disc or cup, means for supplying spray liquid from a reservoir to an inner surface of the sprayhead, an electric motor for rotating the sprayhead about its axis at a rate of 1000 to 8000 rpm, a circular induction electrode disposed adjacent the sprayhead rim, a high voltage generator for charging the electrode to a pontential in the range 1 to 3 Kilovolts, and means for earthing the sprayhead.

6 Claims, 2 Drawing Figures

SPRAYERS

This invention relates to sprayers for use in agriculture, for spraying, for example, insecticides, fungicides and herbicides.

The problem of providing agricultural sprays of controlled droplet size has been before the art for many years. In recent years considerable improvements in this respect have been obtained by the use of sprayers which dispense droplets from a rotating disc. These sprayers give relatively narrow and controllable droplet size spectra, and are extremely useful for a range of agricultural uses. Hand-held versions have commanded wide sales in developing countries for uses such as spraying cotton with insecticides. However, these hand-held sprayers have some drawbacks. The rotating disc is run from a high speed electric motor, driven by dry cells. Such a motor has a relatively high power consumption, so that batteries are quickly used up; furthermore the high speeds involved impose strain on the mechanical components.

We have proposed in U.K. Pat. No. 1569707 a sprayer in which atomisation is effected electrostatically. The charged spray thus produced has particular advantages; it coats foliage evenly, is carried by electric field forces round the backs of leaves, and is less prone to drift away in air currents. The device comprises a conductive nozzle with an adjacent insulated earthed electrode, and a high-voltage generator for applying a voltage to the nozzle of about 15–20 kilovolts. The powerful field thus created between the nozzle and the earthed electrode serves both to charge and atomise spray liquid delivered to the nozzle. This device gives good control of droplet size, uses very little power, and having no moving parts is potentially extremely reliable. It does however have drawbacks; the high voltage generator is relatively expensive (particularly for use in hand-held sprayers in developing countries) and it works best with a spray liquid of relatively closely controlled electrical resistivity, typically between about $10^6$ and $10^{10}$ ohm cm (measured at 20° C.). This resistivity range does not include most water-based sprays (which typically have a conductivity of about $10^4$ ohm cm).

The object of the present invention is to provide an agricultural spraying device producing charged spray droplets; and having a reduced power consumption and potentially greater reliability as compared with known rotary sprayers; and being more suited to the spraying of aqueous liquids, and potentially cheaper to manufacture, than the known sprayers the subject of U.K. Pat. No. 1569707.

According to the present invention we provide an agricultural sprayer, comprising a rotatable conductive sprayhead in the form of a disc or cup, means for supplying spray liquid from a reservoir to an inner surface of the sprayhead, an electric motor for rotating the sprayhead about its axis at a rate of 1000 to 8000 revolutions per minute, a circular induction electrode disposed adjacent the sprayhead rim, a high voltage generator for charging the electrode to a potential in the range 1 to 3 kilovolts, and means for earthing the sprayhead. The invention further provides a process for spraying aqueous liquid pesticidal formulations, which comprises supplying such a formulation to an earthed sprayhead in the form of a conductive disc or cup rotating at a rate in the range 1000 to 8000 revolutions per minute and inducing an electrical charge on the formulation as it atomises from the edge of the rotating disc by means of a circular electrode adjacent the edge charged to a potential in the range 1 to 3 kilovolts.

The circular electrode is conveniently in the form of an annulus.

The device of the invention differs from the prior art in requiring both an electric motor and a high-voltage generator. Using the method and device of the invention liquid is atomised under the influence both of electrostatic and of inertial forces; these combine to produce smaller droplets than either would alone. Thus the electric motors may be designed to run more slowly, and the high-voltage generator to provide a substantially lesser voltage, than in the prior art devices. The electric motor will thus use less current, and the high-voltage generator be substantially cheaper, than in known devices.

A specific embodiment of the invention will now be described with reference to the drawings in which.

Figure 1:
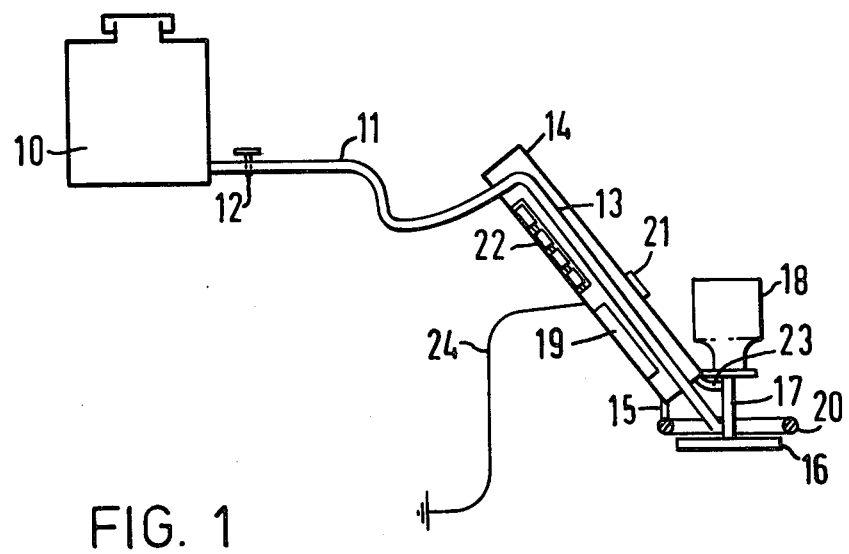
FIG. 1 is a schematic side view, partly in section, of a sprayer according to our invention.
Figure 2:
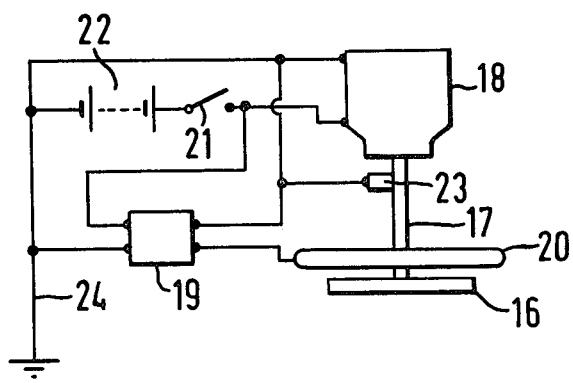
FIG. 2 is a circuit diagram.

The apparatus is a sprayer adapted to be carried by one man, and comprises a reservoir 10 for aqueous spray liquid slung on the operator's back (a 'knapsack sprayer') which is connected via a flexible conduit 11 having a tap 12 to a rigid conduit 13 supported on a spray lance 14. The mouth 15 of the conduit 13 opens on to the surface of a flat metal disc 16, about 10 cm in diameter. The disc 16 is mounted at an angle at the head of the lance 14, on a metal shaft 17 which is arranged to be driven by an electric motor 18 designed to operate at a constant speed of 5000 r.p.m. The lance 14 also carries a high-voltage generator 19, designed to produce a potential that can be varied within the range 1 to 3 kilovolts. One output terminal of the generator 19 is electrically connected to a metal ring 20, about 11 cm in diameter, which is co-axial with the disc 14 and fixed in a plane about 0.5 cm above it. The generator 19 is connected via a switch 21 to an array of dry cells 22, which also drive the motor 18. The shaft 17 is electrically connected via a graphite brush 23 to a trailing metal wire 24, which functions as an earth.

In operation, the device is supported with the shaft 17 roughly vertical over a spray target, such as crops. The tap 12 is opened, and aqueous spray liquid passes by the action of gravity through conduits 11 and 14 onto the surface of the disc 16. The switch 21 is closed, actuating the motor 18 and the generator 19. The disc 16 is thereby rotated at 5000 r.p.m. and the spray liquid is carried to the edge of it and flung off. The generator 19 charges the metal ring 20 to a potential of 1.5 kilovolts; this creates a strong electric field between the ring 20 and the rim of the disc 16, thereby inducing a flow of electric charge (opposite in sign to the charge on the ring) from earth 24 onto disc 16. This charge is picked up by the liquid, so that droplets leaving the rim of disc 16 are subject to electrostatic as well as inertial forces, and are substantially smaller than they would be in the absence of the electric field. On leaving the disc 16, the charged spray particles are carried by inertial forces past the ring 20, and are then attracted to the spray target.

Various possible modifications to the device described above will be apparent to those skilled in the art. For example, instead of being hand-held, it may be designed to be carried on a tractor or aircraft.

I claim:

1. An agricultural sprayer, comprising a rotatable conductive sprayhead in the form of a disc or cup, means for supyling spray liquid from a reservoir to an inner surface of the sprayhead, an electric motor for rotating the sprayhead about its axis at a rate of 1000 to 8000 revolutions per minute, a circular induction electrode disposed adjacent the sprayhead rim, a high-voltage generator for charging the electrode to a potential in the range 1–3 kilovolts, and means for earthing the sprayhead.

2. A sprayer as recited in claim 1 wherein said means for earthing the sprayer comprises a loose, trailing metal wire.

3. A sprayer as recited in claim 2 wherein said electric motor includes a shaft connected to said rotatable conductive sprayhead, and wherein said means for earthing the sprayhead further comprises a stationarily—with respect to the rotating sprayhead—mounted graphic brush engaging said shaft and operatively connected to said trailing metal wire.

4. A sprayer as recited in claim 1 further comprising a single switch means for electrically interconnecting said motor and said generator, at the same time, to a source of e.m.f.

5. A sprayer as recited in claim 4 wherein said source of e.m.f. comprises an array of dry cell batteries mounted to and for movement with, said motor and said circular induction electrode.

6. A process for spraying aqueous liquid pesticidal formulations utilizing an earthed sprayhead in the form of a conductive disc or cup, and a circular electrode adjacent the edge of the disc or cup, comprising the steps of:

rotating the conductor disc or cup at a speed in the range of 1,000–8,000 revolutions per minutes;

supplying aqueous liquid pesticidal formulations to the rotating disc or cup so that it atomizes, with droplets thereof leaving the edge of the rotating disc or cup; and inducing an electrical charge on the formulation as it atomizes from the edge of the rotating disc or cup by charging the electrode to a potential in the range of 1–3 kilovolts.

* * * * *

UNITED STATES PATENT AND TRADEMARK OFFICE
CERTIFICATE OF CORRECTION

PATENT NO. : 4,362,275
DATED : December 7, 1982
INVENTOR(S) : Ronald A. Coffee

It is certified that error appears in the above-identified patent and that said Letters Patent is hereby corrected as shown below:

In the heading, section [30], priority information,

"7935554" is changed to --7939954--.

Signed and Sealed this

First Day of May 1984

[SEAL]

Attest:

GERALD J. MOSSINGHOFF

Attesting Officer

Commissioner of Patents and Trademarks